United States Patent
Cannon et al.

(10) Patent No.: US 6,380,348 B1
(45) Date of Patent: Apr. 30, 2002

(54) POLYESTER POLYCONDENSATION WITH LITHIUM TITANYL OXALATE CATALYST

(75) Inventors: Kevin Charles Cannon, Hatboro; Sri Ram Seshadri, Holland; Ryan Richard Dirkx, Glenmoore, all of PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/999,674

(22) Filed: Oct. 24, 2001

Related U.S. Application Data

(60) Division of application No. 09/415,165, filed on Oct. 8, 1999, which is a continuation-in-part of application No. 09/539,028, filed on Jun. 21, 1999, now abandoned.
(60) Provisional application No. 60/092,032, filed on Jul. 7, 1998.

(51) Int. Cl.[7] ................................................ C08G 63/78
(52) U.S. Cl. ...................... 528/279; 528/275; 528/277; 528/285; 524/777; 524/779
(58) Field of Search ................................ 528/275, 277, 528/279, 285; 524/777, 779

(56) References Cited

U.S. PATENT DOCUMENTS 3,957,886 A * 5/1976 Meyer ............................ 37/44
4,245,086 A * 1/1981 Uno et al. .................. 528/318

FOREIGN PATENT DOCUMENTS

EP 0699700 * 10/1996

* cited by examiner

Primary Examiner—Samuel A. Acquah
(74) Attorney, Agent, or Firm—Nicholas J. DeBenedictis

(57) ABSTRACT

This invention relates to a method for manufacturing polyesters, in particular, to using a lithium titanyl oxalate as the catalyst for such reaction to provide fast reactions with excellent color properties for the resulting polyester. The present invention provides an improved method of producing polyester by the polycondensation of polyester forming reactants wherein the improvement comprises utilizing, as the polycondensation catalyst, lithium titanyl oxalate. The improved process produces a polyester of improved color versus other titanyl oxalate catalysts and a novel polyester without the presence of antimony.

11 Claims, No Drawings

POLYESTER POLYCONDENSATION WITH LITHIUM TITANYL OXALATE CATALYST

REFERENCE TO RELATED APPLICATION

This application is a divisional of U.S. patent application Ser. No. 09/415,165, filed Oct. 8, 1999.

This application is a continuation-in-part of U.S. patent application Ser. No. 09/539,028, filed on Jun. 21, 1999 now Abandoned which claimed the benefit of U.S. Provision Application Serial No. 60/092,032, filed Jul. 7, 1998.

BACKGROUND OF THE INVENTION

This invention relates to a method for manufacturing polyesters, in particular, to using a lithium titanyl oxalate as the catalyst for such reaction to provide fast reactions with excellent color properties for the resulting polyester.

DESCRIPTION OF THE PRIOR ART

Polycondensation reactions used conventionally in the manufacture of polyesters require an extremely long period of time without a catalyst. Therefore, various types of catalysts are used in order to shorten the reaction time. For example, antimony trioxide and manganese acetate are generally used.

Titanyl oxalate compounds have been suggested as catalysts for polycondensation reactions to produce polyesters. However, titanyl oxalate compounds when used as polycondensation catalysts in the manufacture of polyesters have caused color problems in the resulting polyester.

Polyesters are obtained by esterification, ester interchange or polycondensation of dibasic acids such as terephthalic acid and isophthalic acid or esters thereof, functional derivatives of acid chlorides and glycols such as ethylene glycol and tetramethylene glycol or oxides thereof and functional derivatives of carbonic acid derivatives. In this case, a single polyester is obtained when one dibasic acid component and glycol component is used. Mixed copolyesters can be obtained when at least two or more types of dibasic acid component and glycol component are mixed, esterified or subjected to ester interchange and then subjected to polycondensation. When a single polyester or two or more initial polycondensates of a mixed copolyester are subjected to polycondensation, an ordered polyester is obtained. In this invention, the term polyester is a general designation for these three types.

Prior literature has disclosed titanyl oxalate compounds for use as polycondensation catalysts for polyesters. The titanyl oxalate compounds disclosed include potassium titayl oxalate, ammonium titanyl oxalate, lithium titanyl oxalate, sodium titanyl oxalate, calcium titanyl oxalate, strontium titanyl oxalate, barium titanyl oxalate, zinc titanyl oxalate and lead titanyl titanate. However, based upon the examples in such literature references, only potassium and ammonium titanyl oxalate have actually been used to catalyze the polyester forming reaction. See for example Japanese Patent Publication 42-13030, published on Jul. 25, 1967. European Patent application EP 0699700 A2 published o Mar. 6, 1996 assigned to Hoechst and entitled "Process for production of Thermostable, Color-neutral, Antimony-Free Polyester and Products Manufactured From It" discloses the use as polycondensation catalyst, however only potassium titanyl oxalate and titanium isopropylate were used for such a catalyst, and, while improved color and antimony free polyester are disclosed, cobalt or optical brighteners were also employed. Lithium titanyl oxalate was not employed and the present invention's discovery of substantial color improvement with lithium titanyl oxalate versus potassium titanyl oxalate. Other patents have disclosed potassium titanyl oxalate as a polycondensation catalyst for making polyester such as U.S. Pat. No. 4,245,086, inventor Keiichi Uno et al., Japanese Patent JP 06128464, Inventor Ishida, M. et al. U.S. Pat. No. 3,957,886, entitled "Process of Producing Polyester Resin, Inventors Hideo, M. et al, at column 3, line 59 to column 4, line 10, contains a disclosure of titanyl oxalate catalysts for polyesters including a listing of many types of titanyl oxalate catalyst. However, only potassium titanyl oxalate and ammonium titanyl oxalate were used in the examples and lithium titanyl oxalate was not even listed among their preferred titanyl oxalate catalysts.

SUMMARY OF THE INVENTION

The present invention provides an improved method of producing polyester by the polycondensation of polyester forming reactants wherein the improvement comprises utilizing, as the polycondensation catalyst, lithium titanyl oxalate. The improved process produces a polyester of improved color versus other titanyl oxalate catalysts and a novel polyester without the presence of antimony. In addition lithium titanyl oxalate can be used as a polycondensation catalyst in combination with other catalysts to achieve a combination of the attributes of each catalyst in the mixture. Such mixtures include lithium titanyl oxalate with antimony oxide and/or potassium titanyl oxalate $K_2TiO(C_2O_4)_2$. Such mixtures include lithium titanyl oxalate with antimony oxide and/or potassium titanyl oxalate $K_2TiO(C_2O_4)_2$.

DETAILED DESCRIPTION OF THE INVENTION

The production of polyester by polycondensation of polyester forming reactants is well known to those skilled in the polyester art. A catalyst is usually employed such as antimony oxide. Titanyl oxalate catalysts such as potassium titanyl oxalate and ammonium titanyl oxalate have also been suggested as catalysts for the polycondensation reaction to produce polyester. The present invention is based upon the discovery that one titanyl oxalate (lithium titanyl oxalate) is surprisingly superior in catalyst performance for polycondensation reactions by producing polyesters of superior color (white) in comparison to other titanyl oxalate catalysts. The need for an antimony containing catalyst can thereby be eliminated, and an antimony free polyester can thereby be produced with lithium titanyl oxalate as the catalyst. Such advantages provided by using lithium titanyl oxalate are retained when lithium titanyl oxalate is used in combination with other polycondensation catalysts for producing polyester as long as lithium titanyl oxalate comprises at least 5 parts per million based on the weight of titanium in the reaction mixture. Included within the meaning of the term "lithium titanyl oxalate" as used herein are di lithium titanyl oxalate $[Li_2TiO(C_2O_4)_2]$ and mono lithium titanyl oxalate wherein one of the lithiums of di lithium titanyl oxalate is replaced with another alkaline metal such as potassium (e.g., $LiKTiO(C_2O_4)_2$) and such compounds with or without water of hydration. Lithium titanyl oxalate catalysts can be combined with antimony catalyst to achieve the benefits of both catalysts when elimination of antimony is not a requirement for the resulting catalyzed product.

In addition to catalyzing polycondensation reactions, titanyl oxalates of the formula $M_2TiO(C_2O_4)_2(H_2O)_n$ wherein each M is independently selected from potassium, lithium, sodium and cesium are useful for catalyzing esterification and transesterification reactions when used in catalytically effective amounts with reactants known to participate in esterification or transesterification reactions. An advantage to lithium titanyl oxalate catalyst in esterification and transesterification reaction is that it has excellent air stability versus $Ti(OR)_4$. The titanyl oxalate may be anhydrous (n=0) on contain some water of hydration, i.e. n representing the amount of water of hydration. A catalytically effective amount is suitable. Preferred is at least 5 parts of titanyl oxalate based on the weight of titanium per million parts of esterification or transesterification reaction mixture being.

Reactants for forming polyesters via a polycondensation reaction are well known to those skilled in the art and disclosed in patents such as U.S. Pat. No. 5,198,530, inventor Kyber, M., et al., U.S. Pat. No. 4,238,593, inventor B. Duh, U.S. Pat. No. 4,356,299, inventor Cholod et al, and U.S. Pat. No. 3,907,754, inventor Tershasy et al, which disclosures are incorporated herein by reference. The art is also described in "Comprehensive Polymer Science, Ed. G. C. Eastmond, et al, Pergamon Press, Oxford 1989, vol. 5, pp. 275–315, and by R. E. Wilfong, J. Polym. Science, 54 (1961), pp. 385–410. A particularly important commercial specie of polyester so produced is polyester terephthalate (PET).

A catalytically effective amount of lithium titanyl oxalate is added to the polyester forming reactants. Preferred is from 30 parts to 400 parts per million of catalyst based on the weight of polyester forming reactants and based on the weight of titanium in the catalyst.

The superior performance of lithium titanyl oxalate versus other titanyl oxalate catalyst for catalyzing the polycondensation reaction to form polyester is established by the following examples.

Preparation of Polyethyleneterephthalate (PET) using DMT and Ethylene Glycol 305 g of dimethylterephthalate (DMT, 1.572 moles) and 221 g of ethylene glycol (3.565 moles) in the presence of 0.120 g $Li_2TiO(C_2O_4)_2(H_2O)_4$ ($3.68 \times 10^{-4}$ moles) are loaded into a 1.8 liter cylindrical reactor equipped with a bladed stirrer and a motor. The system is heated to 195° C. at atmospheric pressure under nitrogen and maintained at this temperature for 90 minutes, continuously distilling off methanol as it is produced. The pressure is then reduced to 0.1 mbar for 20 minutes. The reaction temperature is then raised to 275–280° C. and maintained under these conditions for 2.5 hours. The polyester obtained is cooled by immersion in water. This rapid cooling resulted in the formation of a PET plug which could be easily removed from the broken glass reactor. The recovered PET plug was then granulated to simplify analysis.

Preparation of PET Using Terephthalic Acid and Ethylene Glycol 150 g of ethylene glycol (2.417 moles), 350 g of terephthalic acid (2.108 moles), and 0.120 g of $Li_2TiO(C_2O_4)_2(H_2O)_4$ ($3.68 \times 10^{-4}$ moles) are mixed into a reaction paste at 40° C. The paste is then added to an equal amount of agitated molten oligomer at 250° C. in a vessel equipped with a column to collect distillates. The temperature is then raised to 265° C. and maintained until no additional water is collected. The pressure is then reduced incrementally to 0.1 mbar for 20 minutes. The reaction temperature is then raised to 275–280° C. and maintained under these conditions for 2.5 hours. The polyester obtained is cooled by immersion in water.

This rapid cooling resulted in the formation of a PET plug which could be easily removed from the broken glass reactor. The recovered PET plug was then granulated to simplify analysis.

General Procedure for the Evaluation of Polycondensation Catalysts

Evaluation of catalysts was performed in an upright tubular glass reactor equipped with a stainless steel stirrer designed to produce a thin film on the walls of the reactor during polycondensation. Volatiles produced under reaction conditions were collected in a series of cold traps, from which they ran be identified and quantified. The reactor and traps were attached to a manifold which permitted the contents of the apparatus to be placed under vacuum or inert atmosphere. Polyethyleneterephthalate (PET) was produced which is probably the most commercially important polyester produced today.

Bis(hydroxyethyl)terephthalate (BHET) and catalyst(s) were added to a reactor and, after evacuation to remove residual air and moisture, the reactor contents were then blanketed with nitrogen. The reactor and contents was then heated to 260° C. by immersion into an oil bath. Temperature was monitored by a thermocouple on the outside wall of the reactor. At 260° C., the reactor stirrer is activated to mix the melted BHET and the catalyst, and stirring at constant speed is maintained throughout the evaluation. The temperature and pressure inside the reactor were then adjusted incrementally to a final value of 280° C. and 0.05 mbar; reactor contents were stirred for 2.5 hours under these conditions. After this time, the apparatus was placed under a nitrogen atmosphere, and the reactor was quickly immersed in a liquid nitrogen bath. This rapid cooling resulted in the formation of a PET plug which could be easily removed from the broken glass reactor. The recovered PET plug was then granulated to simplify analysis. Analyses for the PET samples produced is summarized in Table 1.

EXAMPLES

Example A
(Benchmark—Antimony Catalyst)

42.72 grams of BHET and 0.0153 grams of $Sb_2O_3$ were reacted at a catalyst concentration of 299 ppm Sb according to procedure above.

Example 1

43.50 grams of BHET and 0.0212 grams of $Li_2TiO(C_2O_4)_2(H_2O)_4$ were reacted at a catalyst concentration of 79 ppm Ti according to the procedure above.

Example 2

39.87 grams of BHET and 0.0096 grams of $Li_2TiO(C_2O_4)_2(H_2O)_4$ were reacted at a catalyst concentration of 39 ppm Ti according to the procedure above.

Example B 42.98 grams of BHET and 0.0058 grams of $K_2TiO(C_2O_4)_2(H_2O)_2$ were reacted at a catalyst concentration of 19 ppm Ti according to the procedure above.

Example C 38.45 grams of BHET and 0.0108 grams of $K_2TiO(C_2O_4)_2(H_2O)_2$ were reacted at a catalyst concentration of 39 ppm Ti according to the procedure above.

Example D 42.98 grams of BHET and 0.0057 grams of $K_2TiO(C_2O_4)_2(H_2O)_2$ with 0.0035 grams of $Co(O_2CCH_3)_2$ were reacted at a catalyst concentration of 19 ppm Ti and 19 ppm Co according to the procedure above.

Example E 39.78 grams of BHET and 0.0078 grams of $Cs_2TiO(C_2O_4)_2(H_2O)_n$ were reacted at a catalyst concentration of 19 ppm Ti according to the procedure above.

Example F 43.05 grams of BHET and 0.0057 grams of $Na_2TiO(C_2O_4)_2(H_2O)_n$ were reacted at a catalyst concentration of 19 ppm Ti according to the procedure above.

Table 1. Data for PET produced during catalyst evaluation. IV is the intrinsic viscosity, $M_w$ is the weight average molecular weight, $M_n$ is the number average molecular weight, and color was assigned by visual inspection.

The procedure of the above examples was repeated with the type and amount catalyst as shown in Table 2. The resulting PET product was analyzed and the analytical results are given in Table 2. Clearly superior PET product was obtained with the catalyst and the catalyst mixtures of the present invention. The ratio of the catalyst mixtures in Table 2 given in the column headed "Mix ratio" are weight ratios.

Esterification and Transesterification Evaluation

Several metal oxalates $[M_2TiO(C_2O_4)_2(H_2O)]$ were evaluated as esterification catalysts using the reaction of 2-ethylhexanol (20% excess) with phthalic anhydride at 220° C. The rate of reaction was measured by following the acid number of the composition versus time. The results are summarized in Table 3 for titanates where M=Li, Na, K, or Cs. The catalysts were employed using 25 mg M/100 g of phthalic anhydride. The results for the same reaction using butyl stannoic acid as the catalyst are also shown in the table (catalyst concentration 51.2 mg Sn/100 g anhydride).

The results indicate that the Li, K, Na and Cs titanates catalyze the esterification reaction and would therefore catalyze a transesterification reaction.

We claim:

1. In a catalyzed esterification or transesterification reaction, the improvement which comprises utilizing as the catalyst a titanyl oxalate of the formula $M_2TiO(C_2O_4)_2(H_2O)_n$ wherein each M is independently lithium, and n is zero or represents the amount of water of hydration.

2. The improved reaction of claim 1 wherein the amount of lithium titanyl oxalate present is from 5 parts per million to 400 parts per million based on the weight of titanium per part of polyester forming reactant.

3. The reaction of claim 1 wherein the lithium titanyl oxalate is di lithium titanyl oxalate.

4. The reaction of claim 1 wherein the lithium titanyl oxalate is mono lithium titanyl oxalate.

5. The reaction of claim 3 wherein the mono lithium titanyl oxalate is of the formula $LiKTiO(C_2O_4)_2$.

6. The reaction of claim 3 wherein the lithium titanyl oxalate contains water of hydration.

7. The reaction of claim 4 wherein the lithium titanyl oxalate contains water of hydration.

8. The reaction of claim 5 wherein the lithium titanyl oxalate contains water of hydration.

9. An antimony free polyester produced by the reaction of claim 1.

10. The reaction of claim 1 further comprising utilizing an antimony containing catalyst in combination with the lithium titanyl oxalate catalyst.

11. The reaction of claim 9 wherein said lithium titanyl oxalate catalyst comprises at least 5 parts per million based on the weight of titanium in the reaction mixture.

* * * * *